(12) United States Patent
Watanabe et al.

(10) Patent No.: US 7,613,551 B2
(45) Date of Patent: Nov. 3, 2009

(54) VEHICLE REMOTE OPERATION DEVICE AND METHOD

(75) Inventors: Atsushi Watanabe, Anjo (JP); Naoki Taki, Okazaki (JP)

(73) Assignee: Toyota Jidosha Kabushika Kaisha, Toyota (JP)

( * ) Notice: Subject to any disclaimer, the term of this patent is extended or adjusted under 35 U.S.C. 154(b) by 105 days.

(21) Appl. No.: 11/357,260

(22) Filed: Feb. 21, 2006

(65) Prior Publication Data

US 2006/0197677 A1    Sep. 7, 2006

(30) Foreign Application Priority Data

Feb. 22, 2005   (JP)   ............... 2005-045863

(51) Int. Cl.
    B60R 25/04   (2006.01)
    E05B 17/22   (2006.01)
    G05B 13/00   (2006.01)
    F02P 11/04   (2006.01)

(52) U.S. Cl. .............. 701/2; 701/36; 307/9.1; 307/10.1; 307/10.2; 307/10.3; 307/10.4; 307/10.5; 307/10.6; 398/106; 398/107; 70/256; 70/257

(58) Field of Classification Search .............. 341/176; 123/179.1, 179.2; 165/202; 307/9.1, 10.1–10.8; 296/146.4; 340/426.1–426.23, 5.6–5.64; 701/2, 36; 455/68–70, 73; 398/106, 107; 70/237, 256, 257

See application file for complete search history.

(56) References Cited

U.S. PATENT DOCUMENTS

| | | | | |
|---|---|---|---|---|
| 4,054,950 A | * | 10/1977 | Boone | 375/316 |
| 5,723,911 A | * | 3/1998 | Glehr | 340/10.5 |
| 5,732,074 A | * | 3/1998 | Spaur et al. | 370/313 |
| 6,028,537 A | * | 2/2000 | Suman et al. | 340/988 |
| 6,101,428 A | * | 8/2000 | Snyder | 701/2 |
| 6,144,114 A | * | 11/2000 | Chutorash | 307/10.5 |
| 6,243,022 B1 | * | 6/2001 | Furukawa | 340/825.72 |
| 6,278,869 B1 | * | 8/2001 | Lindenmeier et al. | 455/277.1 |
| 6,346,878 B1 | * | 2/2002 | Pohlman et al. | 340/435 |
| 6,359,348 B1 | * | 3/2002 | King | 307/10.1 |
| 6,396,412 B1 | * | 5/2002 | Banas | 340/5.2 |
| 6,570,486 B1 | * | 5/2003 | Simon et al. | 340/5.1 |
| 6,621,406 B2 | * | 9/2003 | Kumano | 340/5.62 |
| 6,700,475 B1 | * | 3/2004 | Geber et al. | 340/5.61 |

(Continued)

FOREIGN PATENT DOCUMENTS

JP   A-63-145151   6/1988

(Continued)

*Primary Examiner*—Thomas G Black
*Assistant Examiner*—Jonathan M Dager
(74) *Attorney, Agent, or Firm*—Oliff & Berridge, PLC

(57) ABSTRACT

A vehicle remote operation device of optimized fail-safe function is disclosed that directs a vehicle to execute operations in response to a remote operation request made by a user of the vehicle. The vehicle remote operation device has a fail-safe control unit that changes a fail-safe criterion in execution of the remote operation according to a distance between the user and the vehicle. Preferably, the fail-safe criterion is moderated when the distance between the user and the vehicle is short. Alternatively, instead of measuring the distance between the user and the vehicle, a Smart Entry System is used to detect a key carried by the user to determine whether the user is near the vehicle.

11 Claims, 10 Drawing Sheets

U.S. PATENT DOCUMENTS

| | | | |
|---|---|---|---|
| 6,803,851 B1 * | 10/2004 | Kramer et al. | 340/5.61 |
| 6,885,285 B2 * | 4/2005 | Losey | 340/5.72 |
| 6,958,675 B2 * | 10/2005 | Maeda et al. | 340/5.61 |
| 6,960,998 B2 * | 11/2005 | Menard et al. | 340/539.19 |
| 7,046,119 B2 * | 5/2006 | Ghabra et al. | 340/5.72 |
| 7,053,758 B2 * | 5/2006 | Tanaka et al. | 340/426.27 |
| 7,091,824 B2 * | 8/2006 | Matsubara et al. | 340/5.72 |
| 7,149,480 B2 * | 12/2006 | Miyahara | 455/78 |
| 7,167,083 B2 * | 1/2007 | Giles | 340/426.15 |
| 7,349,722 B2 * | 3/2008 | Witkowski et al. | 455/569.2 |
| 7,443,287 B2 * | 10/2008 | Kawamura et al. | 340/426.36 |
| 2001/0020893 A1 * | 9/2001 | Kawai et al. | 340/425.5 |
| 2001/0038328 A1 * | 11/2001 | King et al. | 340/5.64 |
| 2001/0052839 A1 * | 12/2001 | Nahata et al. | 340/5.72 |
| 2002/0033752 A1 * | 3/2002 | Greenwood et al. | 340/5.61 |
| 2002/0160720 A1 * | 10/2002 | Meradi | 455/67.4 |
| 2003/0001723 A1 * | 1/2003 | Masudaya | 340/5.61 |
| 2003/0189481 A1 * | 10/2003 | Hamid | 340/5.53 |
| 2003/0216124 A1 * | 11/2003 | Emmerling et al. | 455/73 |
| 2003/0222757 A1 * | 12/2003 | Ghabra et al. | 340/5.72 |
| 2004/0059483 A1 * | 3/2004 | Sukakura | 701/36 |
| 2004/0155808 A1 * | 8/2004 | Kahn | 341/176 |
| 2004/0183714 A1 * | 9/2004 | Yamashita et al. | 342/70 |
| 2005/0110619 A1 * | 5/2005 | Klein | 340/426.15 |
| 2005/0128068 A1 * | 6/2005 | Winick et al. | 340/517 |
| 2005/0143058 A1 * | 6/2005 | Chang et al. | 455/418 |
| 2005/0164728 A1 * | 7/2005 | Matsubara et al. | 455/521 |
| 2005/0187689 A1 * | 8/2005 | Westerhoff | 701/49 |
| 2005/0258936 A1 * | 11/2005 | Ghabra et al. | 340/5.72 |
| 2006/0145811 A1 * | 7/2006 | Nantz et al. | 340/5.72 |
| 2006/0155431 A1 * | 7/2006 | Berg et al. | 701/2 |
| 2007/0233342 A1 * | 10/2007 | DiCroce et al. | 701/36 |

FOREIGN PATENT DOCUMENTS

JP    A 2004-102939    4/2004

* cited by examiner

FIG.6

| LEVEL | LEVEL 1 | LEVEL 2 | LEVEL 3 | LEVEL 4 (DEFAULT) |
|---|---|---|---|---|
| USER POSITION | INSIDE VEHICLE (SIMILAR TO LOCAL OPERATION) | AROUND VEHICLE (ARM RANGE) | NEAR VEHICLE (VISUAL RANGE) | REMOTE LOCATION |
| FAIL SAVE | | | | |
| MESSAGE BEFORE OPERATION | ○ | ○ | ○ | ○ |
| TRAPPING PREVENTION MECHANISM | ○ | ○ | ○ | ○ |
| SAFETY PATTERN | × | ○ | ○ | ○ |
| CONFIRMATION BEFORE OPERATION | × | × | ○ | ○ |
| OPERATION RESULT NOTIFICATION | × | × | × | ○ |

(○→EXECUTE, ×→DO NOT EXECUTE)

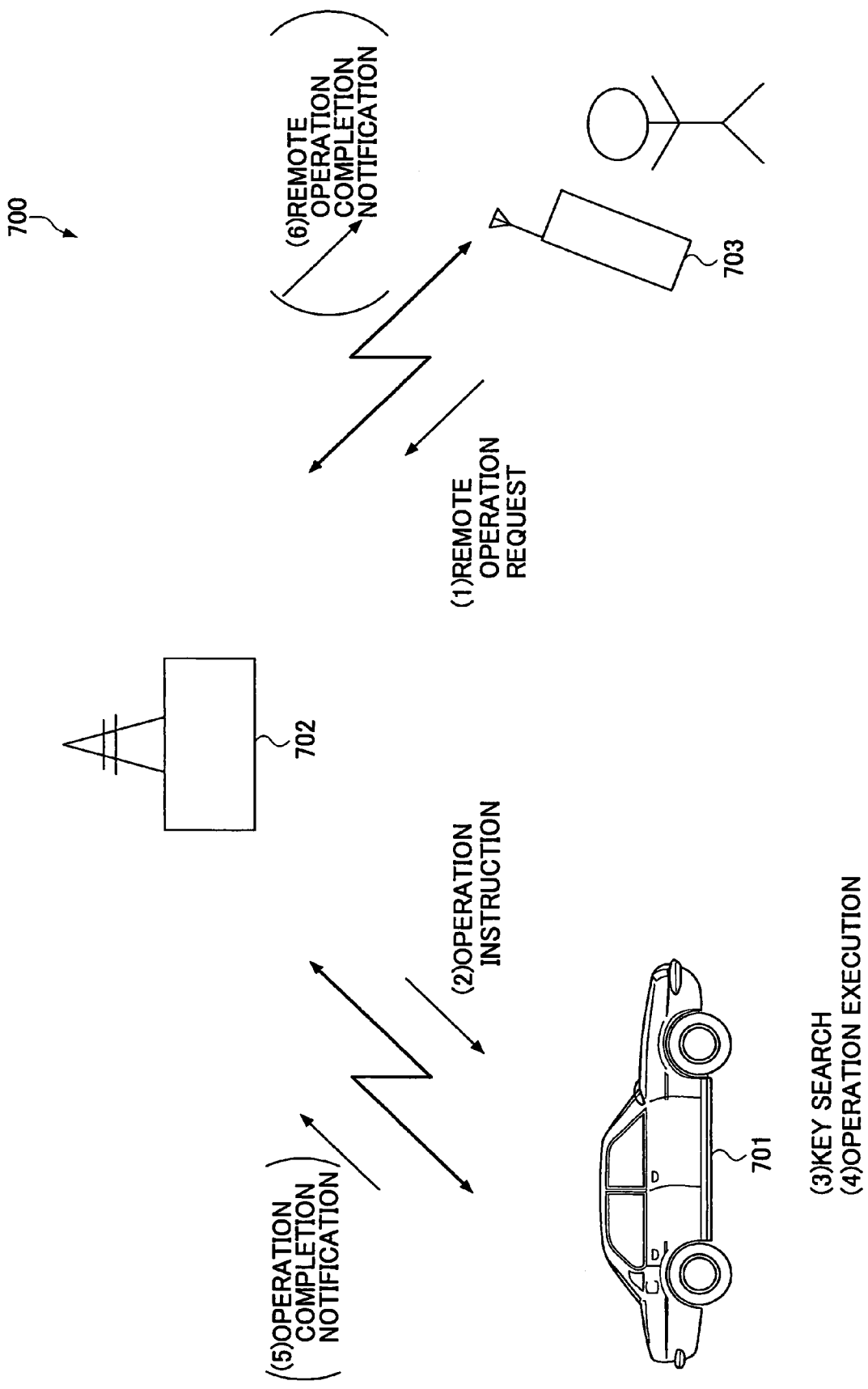

FIG.12

| SMART ENTRY SYSTEM | KEY DETECTION | KEY NOT DETECTED (DEFAULT) |
|---|---|---|
| USER POSITION | AROUND VEHICLE (ARM RANGE) | REMOTE LOCATION |
| FAIL SAVE | | |
| MESSAGE BEFORE OPERATION | ○ | ○ |
| TRAPPING PREVENTION MECHANISM | ○ | ○ |
| SAFETY PATTERN | ○ | ○ |
| CONFIRMATION BEFORE OPERATION | × | ○ |
| OPERATION RESULT NOTIFICATION | × | ○ |

(○ → EXECUTE, × → DO NOT EXECUTE)

VEHICLE REMOTE OPERATION DEVICE AND METHOD

BACKGROUND OF THE INVENTION

1. Field of the Invention

The present invention relates to a vehicle remote operation device able to direct a vehicle to execute operations in response to a remote operation request made by a user of the vehicle and a method thereof, and more particularly, to a vehicle remote operation device of optimized fail-safe functions and a method thereof.

2. Description of the Related Art

For example, Japanese Laid Open Patent Application No. 2004-102939 discloses a device that directs a vehicle to execute operations requested by a user of the vehicle.

With the device disclosed in the above reference, a user of a vehicle is able to close a window of the vehicle or turn off a hazard lamp of the vehicle by using a cellular phone.

In practical vehicle remote operations, a user of the vehicle, who requests to operate a vehicle from a remote place, does not precisely know the actual conditions of the vehicle. For this reason, usually, various fail-safe functions are provided.

However, in the device disclosed in the above reference, remote operations are performed without considering the positional relationship between the user who requests the remote operation and the vehicle to be operated at all. Due to this, even when the user is close to the vehicle, and is aware of the actual conditions of the vehicle very well, the same fail-safe operations as those for a remote location is performed.

That is, because of the undue fail-safe operations, the remote operation is not convenient, of poor response, and time consuming.

SUMMARY OF THE INVENTION

Accordingly, it is a general object of the present invention to solve one or more problems of the related art.

A specific object of the present invention is to provide a vehicle remote operation device of an optimized fail-safe function a method thereof.

According to a first aspect of the present invention, there is provided a vehicle remote operation device for directing a vehicle to execute operations in response to a remote operation request made by a user of the vehicle, comprising: a fail-safe control unit that changes a fail-safe criterion in execution of the remote operation according to a distance between the user and the vehicle.

For example, the distance between the user and the vehicle can be calculated from detection results obtained through communications from a position detector (for example, a device using GPS) carried by the vehicle and a position detector (for example, a device using GPS) installed in a mobile terminal carried by the user.

Here, the "fail-safe criterion" is expressed by types and numbers of the fail-safe operations sufficiently ensuring safety.

According to the present invention, from the distance between the user, who requests a remote operation, and the vehicle, which is to be remotely operated, it is predicted the extent to which the user is aware of the present condition and situation of the vehicle, and in response to the predicted awareness of the user about the present situation of the vehicle, the contents of the fail safe operations are changed. Hence, the fail safe function is optimized from the point of view of safety without excessive or deficient fail safe operations.

As an embodiment, the fail-safe criterion is moderated when the distance between the user and the vehicle is short.

Because when the distance between the user, who requests a remote operation, and the vehicle, which is to be remotely operated, is short, it is easy for the user to be aware of the present situation of the vehicle, and it is easy to execute the remote operations appropriately. Thus, preferably, the fail-safe criterion is moderated when the distance between the user and the vehicle is short.

Specifically, the distance between the user and the vehicle may be divided into plural levels according to the length of the distance, and fail-safe operations are established for each of the levels so that a smaller number of the fail-safe operations are executed when the distance between the user and the vehicle is short.

As another embodiment, the distance between the user and the vehicle is divided into at least two levels according to whether the vehicle is within visual range of the user, that is, the user is at a position able to visually confirm conditions of the vehicle. When the vehicle is within the visual range of the user, the fail-safe operations do not include notifying the user of an operation result of the remote operation, that is, in the fail-safe operations, notification of the operation result of the remote operation to the user is not performed.

Alternatively, the distance between the user and the vehicle may be divided into at least two levels according to whether the vehicle is within reach of the user's arm, and when the vehicle is within the reach of the user's arm, the fail-safe operations do not include condition confirmation before the remote operation. That is, in the fail-safe operations, condition confirmation before the remote is not performed.

Alternatively, the distance between the user and the vehicle may be divided into at least two levels according to whether the user is inside the vehicle, and when the user is inside the vehicle, the fail-safe operations do not include using a safety operation pattern in the execution of the remote operation. That is, in the fail-safe operations, a safety operation pattern is not used in the execution of the remote operation.

One of the fail-safe operations is to send the operation result of the remote operation, for example, to the communication terminal carried by the user by an email.

Another one of the fail-safe operations is to confirm situations before the remote operation. For example, before the remote operation, it is confirmed whether the vehicle is running, whether there are any persons inside the vehicle, whether a key is being inserted into the vehicle, whether the door is open.

Another one of the fail-safe operations is to use a safety operation pattern in the execution of the remote operation. For example, when performing the remote operation to close a window of the vehicle, the vehicle may be moved slightly and suddenly to call attention of persons in the vehicle, for example, to remind the persons to draw back their hands so as not to be trapped.

In the present invention, when the vehicle is within the visual range of the user, the user is able to visually confirm the results of operations; when the vehicle is within the reach of the user's arm, the user can confirm the conditions of the vehicle prior to the remote operations and remove an interference (for example, withdraw a key, or ask persons in the vehicle to come out); when the user is inside the vehicle, the remote operation is the same as the local operation by using switches inside the vehicle. Hence, in the above situations, unnecessary undue fail-safe operations can be omitted.

From the point of view of satisfying the minimum safety requirements, preferably, even at the level having the least number of the fail-safe operations, as the fail-safe operations, a reminder message (for example, to raise an alarm) may be sent before the execution of the remote operation; alternatively, as the fail-safe operations, a window trapping protection mechanism may be directed to operate when performing the remote operation to close a window of the vehicle.

As an embodiment, the distance between the user and the vehicle may be divided according to the length of the distance into a first level, a second level, a third level, and a fourth level in ascending order of the length, the first level being defined as when the user is inside the vehicle, the second level being defined as when the vehicle is within the reach of the user's arm, the third level being defined as when the vehicle is within the visual range of the user, the fourth level being defined as when the distance between the user and the vehicle is not classified into one of the first level, the second level, and the third level. When the distance between the user and the vehicle is classified into the fourth level, the fail-safe operations include sending a reminder message before the execution of the remote operation, using a safety operation pattern in the execution of the remote operation, condition confirmation before the execution of the remote operation, and notifying the user of an operation result of the remote operation. When the distance between the user and the vehicle is classified into the third level, the fail-safe operations include sending a reminder message before the execution of the remote operation, using a safety operation pattern in the execution of the remote operation, and condition confirmation before the execution of the remote operation. When the distance between the user and the vehicle is classified into the second level, the fail-safe operations include sending a reminder message before the execution of the remote operation, and using a safety operation pattern in the execution of the remote operation. When the distance between the user and the vehicle is classified into the first level, the fail-safe operations include sending a reminder message before the execution of the remote operation. When performing the remote operation to close a window of the vehicle, the fail-safe operations include directing the window trapping protection mechanism to operate regardless of the level of the distance.

As an embodiment, the distance between the user and the vehicle may be divided into at least two levels according to whether a key is detected by a Smart Entry System, and the number of the fail-safe operations when the key is detected is smaller than the number of the fail-safe operations when the key is not detected.

Here, the Smart Entry System is also referred to as "Smart Key System" (registered trade mark), which is a key-less entry system, and the user does not need to press any buttons when using the Smart Entry System. Specifically, an in-vehicle device installed in the vehicle transmits a calling signal at preset intervals; when a radio device (the key) carried by the user receives the calling signal, the radio device sends a response signal; when the response signal is received by the in-vehicle device, the vehicle unlocks the door or locks the door. With such a Smart Entry System, when the user carrying the key just moves close to or away from the vehicle, the door of the vehicle is unlocked or locked.

As an embodiment, when the key is detected by the Smart Entry System, the fail-safe operations do not include notifying the user of an operation result of the remote operation; alternatively, the fail-safe operations do not include condition confirmation before the remote operation. In this way, the number of the fail safe operations is reduced.

In the fail-safe operation of sending the operation result of the remote operation, for example, the operation result of the remote operation is sent to the communication terminal carried by the user by an email.

In the fail-safe operation of confirming situations before the remote operation, for example, it is confirmed before the remote operation whether the vehicle is running, whether there is any person inside the vehicle, whether a key is being inserted into the vehicle, or whether the door is open.

According to the present invention, by using the Smart Entry System, it can be determined whether the user carrying the key is within a preset detection area relative to the vehicle, and from this result, it is easy to determine whether the user is so close to the vehicle that the user can be aware of the current situation of the vehicle. Based on these results, even without measuring the distance between the user and the vehicle, from the predicted awareness of the user about the present situation of the vehicle, the contents of the fail safe operations may be changed appropriately. Hence, the fail safe function can be optimized according to the safety consideration without excess and deficiency of the fail safe operations.

From the point of view of satisfying the minimum safety requirements, preferably, even when the key is detected by the Smart Entry System, as the fail-safe operations, a reminder message (for example, to raise an alarm) may be sent before the execution of the remote operation; alternatively, as the fail-safe operations, a window trapping protection mechanism may be directed to operate when performing the remote operation to close a window of the vehicle.

As an embodiment, when the key is not detected by the Smart Entry System, the fail-safe operations include sending a reminder message before the execution of the remote operation, using a safety operation pattern in the execution of the remote operation, condition confirmation before the execution of the remote operation, and notifying the user of an operation result of the remote operation. When the key is detected by the Smart Entry System, the fail-safe operations include sending a reminder message before the execution of the remote operation, and using a safety operation pattern in the execution of the remote operation. The fail-safe operations include directing a window trapping protection mechanism to operate when performing the remote operation to close a window of the vehicle no matter whether the key is detected or not.

In the fail-safe operation of using a safety operation pattern in the execution of the remote operation, for example, when performing the remote operation to close a window of the vehicle, the window may be moved slightly and suddenly to call attention of persons in the vehicle, for example, to remind the persons to draw back their hands so as not to be trapped.

In the present invention, when the key is detected, because the user is able to visually confirm the results of operations, and the user can confirm the conditions of the vehicle prior to the remote operations and remove interference (for example, withdraw a key, or ask persons in the vehicle to come out), compared to the case when the key is not detected, unnecessary undue fail-safe operations can be omitted.

According to a second aspect of the present invention, there is provided a vehicle remote operation method for directing a vehicle to execute operations in response to a remote operation request made by a user of the vehicle, comprising a step of: changing a fail-safe criterion in execution of the remote operation according to a distance between the user and the vehicle.

According to the present invention, it is possible to provide a vehicle remote operation device of an optimized fail-safe function.

These and other objects, features, and advantages of the present invention will become more apparent from the following detailed description of preferred embodiments given with reference to the accompanying drawings.

BRIEF DESCRIPTION OF THE DRAWINGS

FIG. 6 is a table indicating the correspondence relationship between the distance from the vehicle 101 to the communication terminal 103 and the fail safe level;

FIG. 7 is a diagram schematically illustrating an overall configuration of the vehicle remote operation system 700 according to the second embodiment of the present invention;

FIG. 12 is a table exemplifying the correspondence relationship between the detection results of the SMART ENTRY SYSTEM and the fail safe level.

DESCRIPTION OF THE PREFERRED EMBODIMENTS

Below, preferred embodiments of the present invention are explained with reference to the accompanying drawings. Primarily, a power window closing operation is described as an example, in which an open window is closed even though the ignition (IG) of a vehicle is tuned off.

First Embodiment

FIG. 1 through FIG. 6 disclose a vehicle remote operation system according to a first embodiment of the present invention.

In a vehicle remote operation system 100 according to the present embodiment, according to the positional relationship between a user who requests a remote operation on a vehicle 101, and the vehicle 101 to be remotely operated, contents of fail safe operations are changed when the requested remote operation is executed in the vehicle 101.

Figure 1:
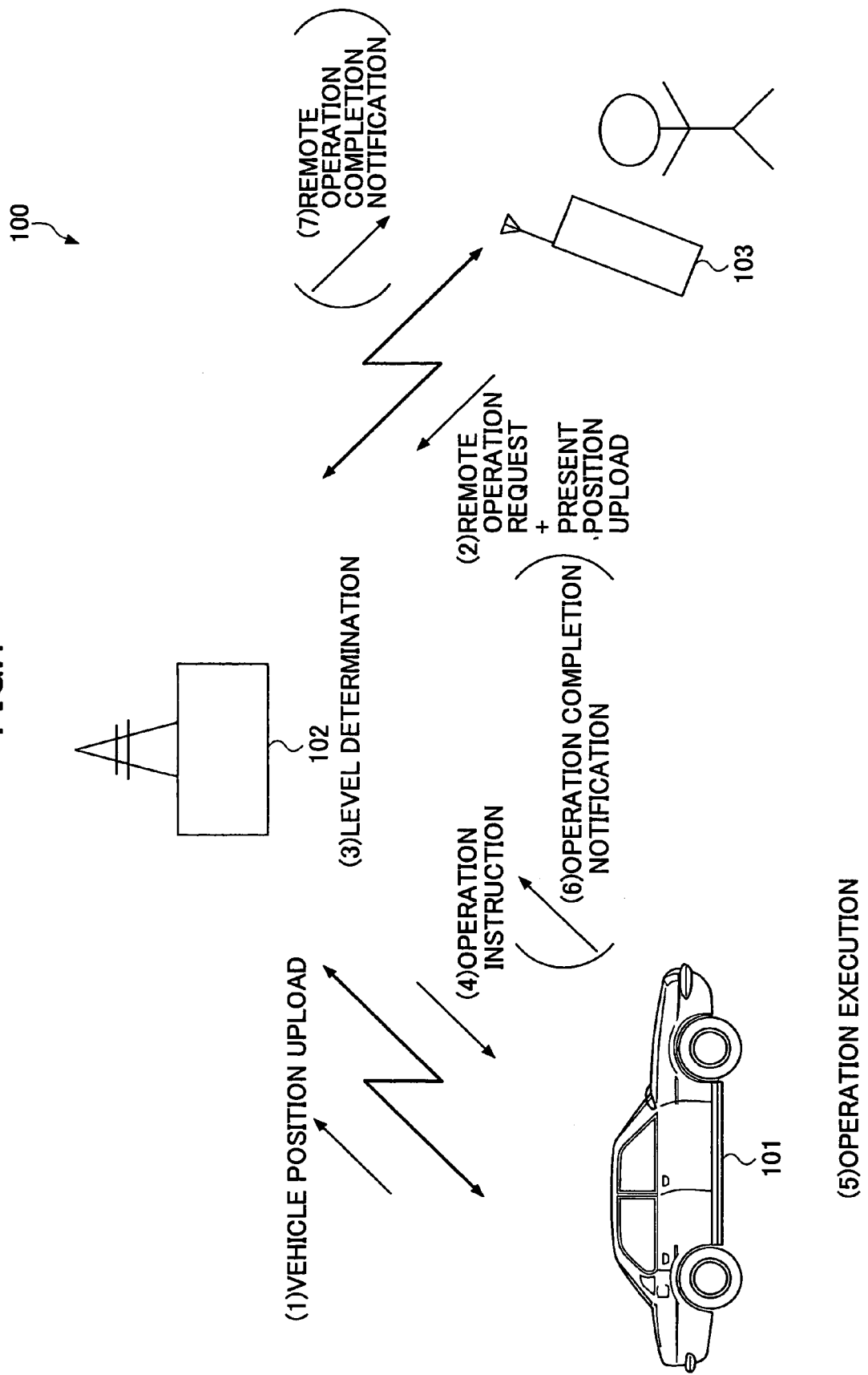
FIG. 1 is a diagram schematically illustrating an overall configuration of the vehicle remote operation system 100 according to the first embodiment of the present invention.

FIG. 1 is a diagram schematically illustrating an overall configuration of the vehicle remote operation system 100 according to the present embodiment.

The vehicle remote operation system 100 includes the vehicle 101; a center 102 which is managed by, for example, an automobile manufacturer, an automobile retailer, or a professional company; and a communication terminal 103 carried by a user (owner) of the vehicle 101.

When operating the vehicle 101 to execute the remote operation requested from the user by using the communication terminal 103, the center 102 calculates the distance between the current position of the vehicle 101 uploaded from the vehicle 101 and the current position of the communication terminal 103 uploaded from the communication terminal 103, and specifies a fail safe level in the vehicle 101 according to the obtained result.

Then, when executing the operation directed by the center 102, the vehicle 101 changes the contents of the fail safe operations according to the fail safe level specified by the center 102.

Below, with reference to FIG. 2 through FIG. 6, descriptions are made of the configuration and operations of the vehicle remote operation system 100 of the present embodiment.

Figure 2:
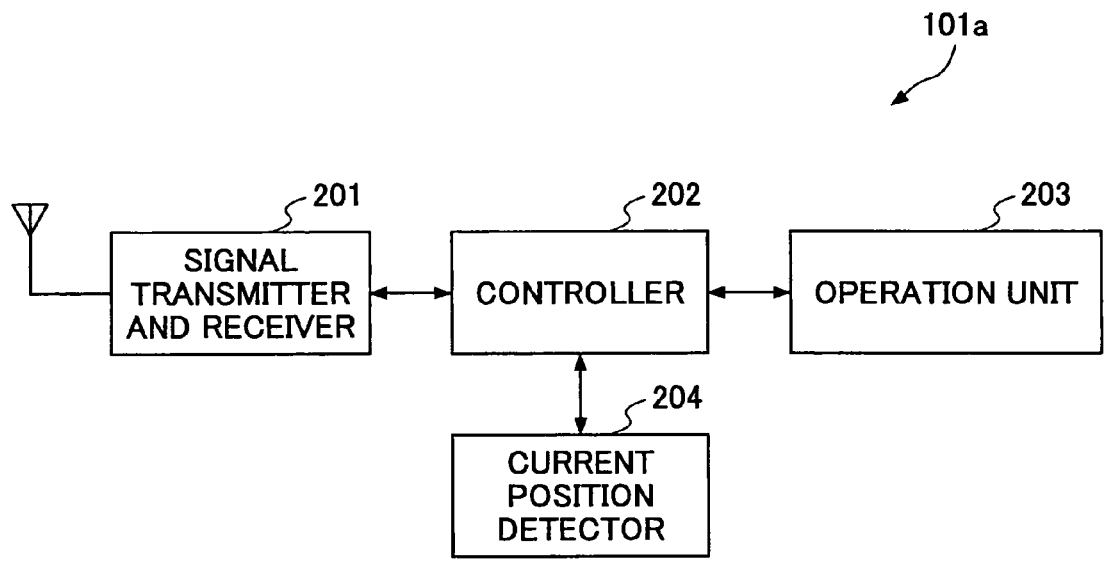
FIG. 2 is a block diagram schematically illustrating a configuration of an in-vehicle device 101a installed in the vehicle 101 for executing operations as directed by the center 102.

FIG. 2 is a block diagram schematically illustrating a configuration of an in-vehicle device 101a installed in the vehicle 101 for executing operations as directed by the center 102.

The in-vehicle device 101a includes a signal transmitter and receiver 201 for transmitting signals to and receiving signals from the center 102, a controller 202 for controlling components of the in-vehicle device 101a, an operation unit 203 for executing operations such as locking a door or turning off a hazard lamp or closing a window, and a current position detector 204 for detecting the current position of the vehicle 101.

The operation unit 203 executes the fail safe operations, as described below.

For example, the current position detector 204 may include a GPS receiver for acquiring the latitude and longitude information of the vehicle 101. Alternatively, the current position detector 204 may include a navigation system GPS receiver for acquiring the latitude and longitude information of the vehicle 101.

The controller 202 sends information of the current position of the vehicle 101 detected by the current position detector 204 to the center 102 through the signal transmitter and receiver 201 when the IG (ignition) of the vehicle 101 is tuned off. In addition, when the controller 202 receives an instruction of closing an open window from the center 102 through the signal transmitter and receiver 201, the controller 202 controls the operation unit 203 to close the window.

Figure 3:
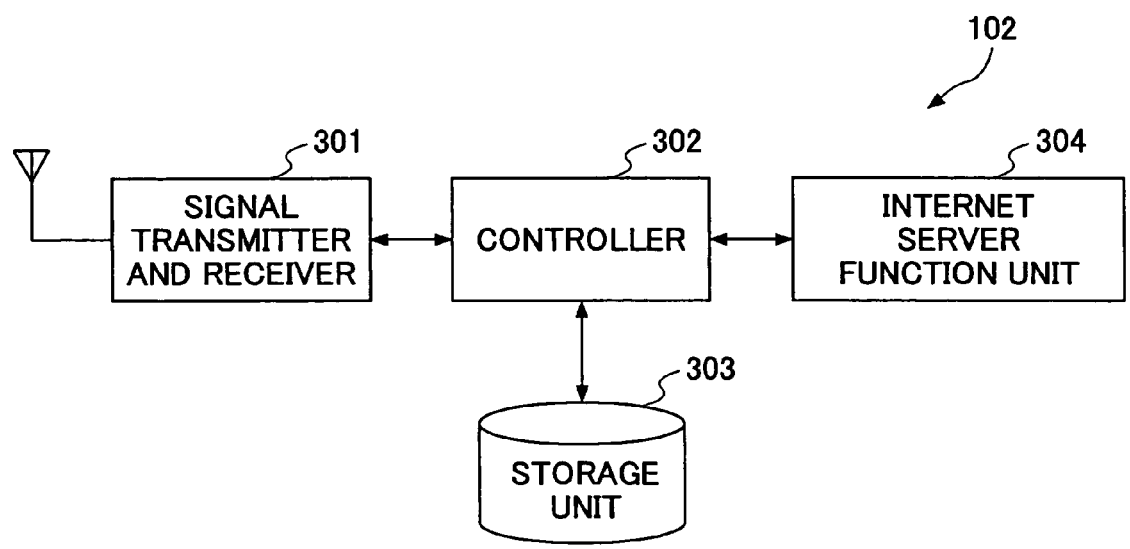
FIG. 3 is a block diagram schematically illustrating a configuration of the center 102 which acts as a vehicle remote operation device to direct the in-vehicle device 101a of the vehicle 101 to execute the operations requested by the user.

FIG. 3 is a block diagram schematically illustrating a configuration of the center 102 which acts as a vehicle remote operation device to direct the in-vehicle device 101a of the vehicle 101 to execute the operations requested by the user.

The center 102 includes a signal transmitter and receiver 301 for transmitting signals to and receiving signals from the in-vehicle device 101a, a controller 302 for controlling components of the center 102, a storage unit 303 for storing data in the format of a database, and an Internet server function unit 304 able to provide Web pages accessible by the user through the communication terminal 103, and able to send emails to the communication terminal 103.

Here, the storage unit 303 may be any storage media.

When the controller 302 receives the current position information of the vehicle 101, the IG of which is tuned off, from the in-vehicle device 101a through the signal transmitter and receiver 301, the controller 302 stores the current position information in the storage unit 303 in connection with the vehicle 101, which is the source of the information. In other words, the last position of the vehicle 101 after the IG is tuned off is stored.

In addition, in the storage unit 303, a table (as described with reference to FIG. 6) is stored in advance which shows the correspondence relationship between the distance from the vehicle 101 to be remotely operated to the communication terminal 103 of the user, and the contents of the fail safe operation to be executed by the in-vehicle device 101a in execution of the remote operation.

Further, when the controller 302 receives a request of a remote operation from the communication terminal 103 through the Internet server function unit 304, the controller 302 calculates the distance between the current position of the vehicle 101 stored in the storage unit 303 and the current position of the communication terminal 103 sent from the communication terminal 103 through the Internet server function unit 304, and specifies a fail safe level in the vehicle 101 in execution of the remote operation with reference to the above mentioned table.

The controller 302 sends the specified fail safe level to the in-vehicle device 101a of the vehicle 101 together with an instruction for operation.

Figure 4:
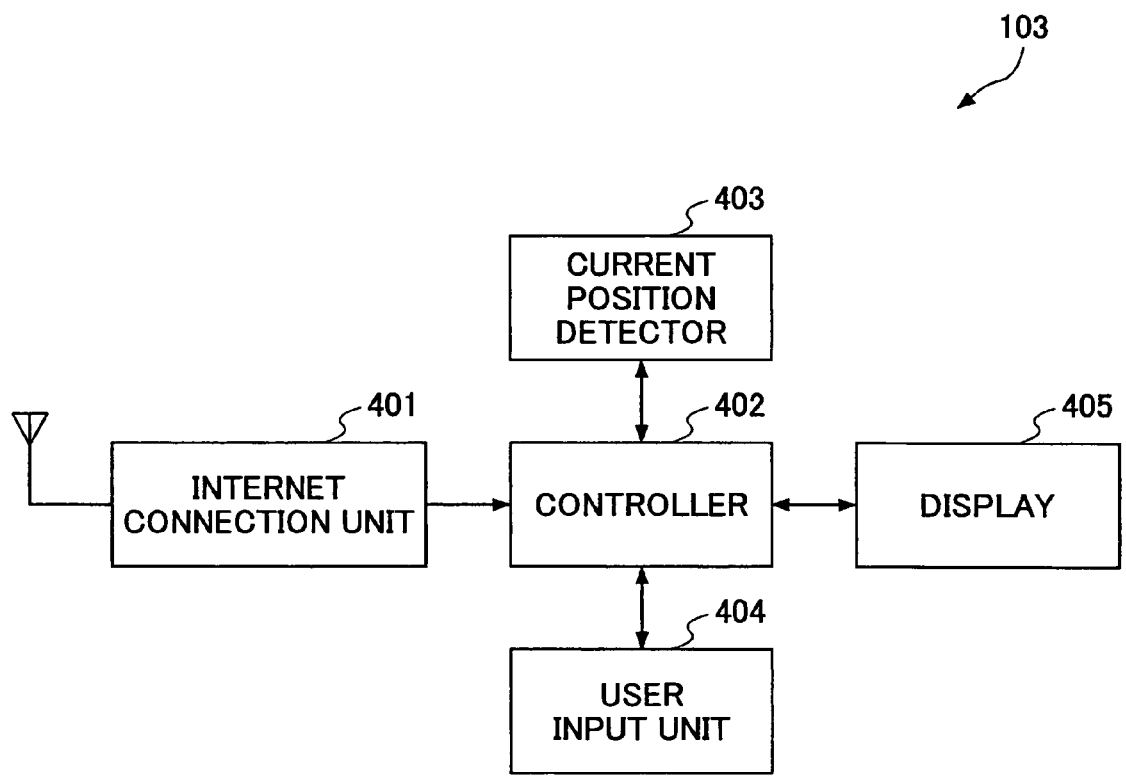
FIG. 4 is a block diagram schematically illustrating a configuration of the communication terminal 103 used when the user executes the remote operations.

FIG. 4 is a block diagram schematically illustrating a configuration of the communication terminal 103 used when the user executes the remote operations.

For example, the communication terminal 103 is a cellular phone which has the GPS function and is able to connect to the Internet. Alternatively, the communication terminal 103 may be a PDA (Personal Digital Assistant) or a notebook personal computer.

The communication terminal 103 includes an Internet connection unit 401 for accessing a Web page provided by the Internet server function unit 304, a controller 402 for controlling components of the communication terminal 103, a current position detector 403 for detecting the current position of the communication terminal 103, for example, by utilizing the GPS technique, a user input unit 404 for inputting character strings to the communication terminal 103 and for selecting items from a menu, and a display 405 for displaying the Web page being accessed to the user.

For example, the display 405 is a small LCD (liquid crystal display); alternatively, the display 405 may be integrated with the user input unit 404, and used as a touch panel.

Below, a description is made of the vehicle remote operation performed by the devices having the above configuration.

Figure 5:
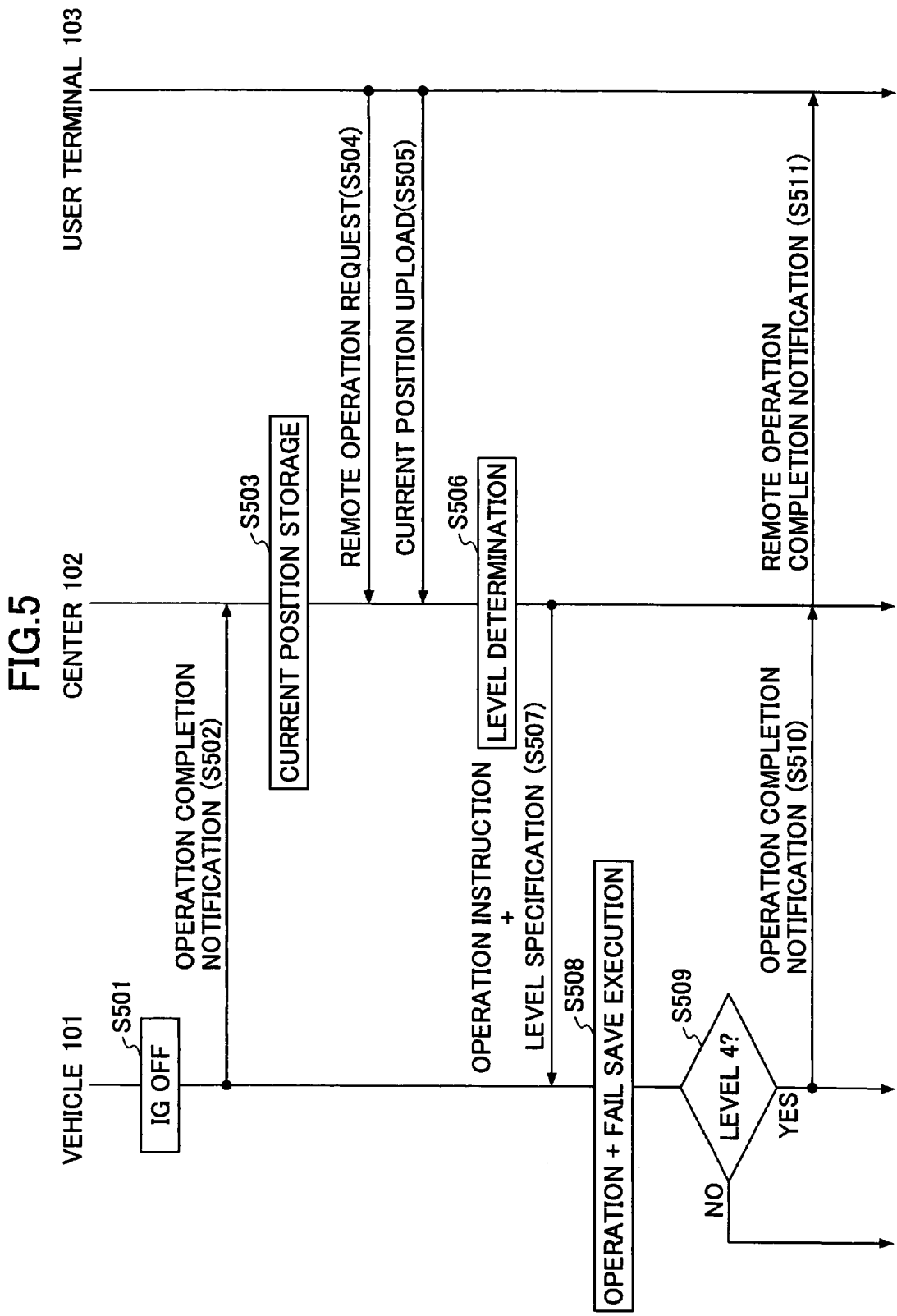
FIG. 5 is a sequence diagram illustrating the vehicle remote operation according to the first embodiment.

FIG. 5 is a sequence diagram illustrating the vehicle remote operation according to the present embodiment.

In step S501, the IG of the vehicle 101 is tuned off.

In step S502, after the IG of the vehicle 101 is tuned off, the controller 202 of the in-vehicle device 101a sends information of the current position of the vehicle 101 detected by the current position detector 204 to the center 102 through the signal transmitter and receiver 201.

In step S503, at the center 102, when the information of the current position of the vehicle 101 is received by the signal transmitter and receiver 301, the controller 302 stores the current position information in the storage unit 303 in connection with the vehicle 101.

In step S504, the user accesses the Web page provided by the Internet server function unit 304 by using the communication terminal 103; for example, the user requests a remote operation of closing the window of the vehicle 101.

For example, the user is reminded by the center 102 to make this request through the following series of actions. Specifically, the in-vehicle device 101a detects that the window is open even after the IG of the vehicle 101 has been tuned off for a time period, and the in-vehicle device 101a notifies the center 102 of this fact. Then, the center 102 sends a message to the communication terminal 103 by an email through the Internet server function unit 304 to remind the user that he or she forgot to close the window.

In step S505, on the Wed page, after the user is authenticated, and an item of "close the window" is selected on the Wed page, the controller 402 of the communication terminal 103 uploads the current position of the communication terminal 103 detected by the current position detector 403 through the Internet connection unit 401.

Detection of the current position of the communication terminal 103 and uploading of the detection results to the center 102 may be performed upon request from the center 102 when requesting the remote operation, or may be performed automatically when requesting the remote operation by installing software on the side of the communication terminal 103.

In step S506, when the user requests a remote operation of closing the window of the vehicle 101, and the Internet server function unit 304 confirms that the current position of the communication terminal 103 is received, the controller 302 of the center 102 reads out the last position of the vehicle 101 after the IG is tuned off. Then, the controller 302 calculates the distance between the current position of the vehicle 101 and the current position of the communication terminal 103, and specifies a fail safe level in execution of the remote operation with reference to the above mentioned table in which distance data are stored in advance.

FIG. 6 exemplifies the table indicating the correspondence relationship between the distance from the vehicle 101 to the communication terminal 103 and the fail safe level.

As shown in FIG. 6, the distance between the vehicle 101 and the communication terminal 103 is divided into four levels, and at different levels, the contents of fail safe operations are different.

Among the four levels (level 1, level 2, level 3, and level 4), the level 4 is defined to correspond to a longest distance between the vehicle 101 and the communication terminal 103, that is, the user is furthest away from the vehicle 101. The level 4 is the default state. As the user is closer and closer to the vehicle 101, the number of the fail safe operations to be executed is reduced; thus, the contents of the fail safe operations are changed, making the fail safe criterion moderate.

Specifically, in a usual remote operation, that is, when the user is far away from the vehicle 101, the distance is classified to be the level 4, and since the user is not aware of the current situation of the vehicle 101, all the fail safe operations shown in FIG. 6 are executed.

For example, as shown in FIG. 6, in the remote operation of closing the window of the vehicle 101, the fail-safe operations may include (a) sending a reminder message before the remote operation, (b) directing a window trapping protection mechanism to operate, (c) using a safety operation pattern in execution of the remote operation, (d) confirming situations before the remote operation, and (e) sending operation results of the remote operation.

As the reminder message, which is one fail-safe operation, for example, an alarm may be raised, such as sounding a buzzer, so that persons around the window will not have their fingers trapped when the window is moved up automatically.

The window trapping protection mechanism, which is directed to operate as another fail-safe operation, for example, detects whether foreign matter is trapped between the window frame and the window when the window is moved up automatically, and the window trapping protection mechanism automatically drives the window to move down temporarily.

The safety operation pattern in execution of the remote operation is another fail-safe operation. For example, before the window is moved up automatically, the vehicle may be moved slightly and suddenly to call attention of persons in the vehicle, for example, to remind the persons in the vehicle 101 to draw back their hands so as not to be trapped.

Situation confirmation before the remote operation is another fail-safe operation. For example, before the window is moved up automatically, it is confirmed that the vehicle 101 is not running, that there is not any person inside the vehicle 101, that a key is not being inserted into the vehicle 101, and that the door is not open. When these conditions are not satisfied, operation is not performed to move the window up automatically.

As for transmission of operation results of the remote operation, which is another fail-safe operation, for example, when the window is completely closed, the min-vehicle device 101*a* notifies the center 102 through communications that the remote operation is finished. Receiving this notification, the center 102 sends a message to the communication terminal 103 carried by the user by an email to notify the user that the remote operation is finished.

When the user is around the vehicle 101, specifically, when the vehicle 101 is within visual range of the user, the distance from the user to the vehicle 101 is classified to be the level 3. In this case, since the user is able to visually confirm the operation results, among the above fail safe operations (a), (b), (c), (d), and (e), the fail safe operation of (e), namely, sending operation results of the remote operation, is omitted.

Here, a range in which "the user is around the vehicle", and "the visual range of the user", for example, may correspond to a range in which remote control with a conventional button-pressing type key-less entry system is operable; specifically, it may be a range covering about 11 meters. Within this range, when a remote controller is operable, the distance from the user to the vehicle 101 is automatically classified to be the level 3.

As a result, when the distance from the user to the vehicle 101 is at the level 3, because the user is able to visually confirm the operation results, the fail safe operation of sending the operation results of the remote operation to the user can be omitted; hence, the user does not need to perform communications to receive the unnecessary signals, the cost of communications is reduced, and it makes the user more comfortable.

When the user is near the vehicle 101, specifically, when the vehicle 101 is within the reach of the user's arm, the distance from the user to the vehicle 101 is classified to be the level 2. In this case, the user can easily confirm the conditions of the vehicle 101 before the remote operations and remove interference, for example, the user can easily confirm whether the vehicle 101 is running; if the key is being inserted in the vehicle 101, the user can easily withdraw the key by himself; if the door is open, the user can easily close the door by himself; further, if some persons are in the vehicle 101, the user can easily urge them to come out. Therefore, among the above fail safe operations (a), (b), (c), (d), and (e), the fail safe operations of (d), namely, confirming situations before the remote operation, and (e), namely, sending operation results of the remote operation, can be omitted.

As a result, when the distance from the user to the vehicle 101 is at the level 2, the user is able to perform the remote operation quickly, undue fail-safe operations are omitted, and the remote operation is convenient and of good response to the user's request.

When the user is inside the vehicle, the remote operation is the same as the local operation by using switches inside the vehicle. Hence, in the above situations, unnecessary undue fail-safe operations can be omitted.

When the current position of the vehicle 101 is approximately the same as the current position of the communication terminal 103, namely, it is determined that the user is inside the vehicle 101, the distance from the user to the vehicle 101 is classified to be the level 1.

In this case, since the user can use switches attached inside the vehicle to perform any operations locally, such as close the window, and can pay attention to the window by himself so as not to be trapped.

Therefore, among the above fail safe operations (a), (b), (c), (d), and (e), the fail safe operations of (c), namely, using a safety operation pattern in execution of the remote operation, (d), namely, confirming situations before the remote operation, and (e), namely, sending operation results of the remote operation, can be omitted.

In other words, even at the level 1, which is roughly the same as local operations, as long as a remote operation is performed, for the purposes of ensuring safety at the least level, the fail safe operations of (a), namely, sending a reminder message before the remote operation, and (b), namely, directing a window trapping protection mechanism to operate, are performed.

That is, when the distance from the user to the vehicle 101 is at the level 1, although the operation instruction system has to operate through the center 102 by communications, it is possible to realize a simple and quick remote operation very close to the local operation of the vehicle.

Returning to FIG. 5, in step S507, with the above criterion, when the fail safe level is determined in step S506, the controller 302 of the center 102 uses the signal transmitter and receiver 301 to direct the vehicle 101 to perform an operation of closing the window.

In step S508, on the side of the vehicle 101, when the signal transmitter and receiver 201 receives instructions and the fail safe level from the center 102, the controller 202 directs the operation unit 203 to automatically raise the window to close the window which is being open, and executes the fail safe operations as shown in FIG. 6 at a certain fail safe level.

In step S509, the controller 202 of the in-vehicle device 101*a* determines whether it is necessary to send the operation results of the remote operation (that is, if the distance is at the level 4 as shown in FIG. 6) If it is determined that it is necessary to send the operation results (that is, "YES" in step S509), in step S510, the controller 202 of the in-vehicle device 101*a* sends an operation completion notification to the center 102 through the signal transmitter and receiver 201.

In step S511, on the side of the center 102, when the signal transmitter and receiver 301 receives the operation completion notification from the vehicle 101, the controller 302 directs the Internet server function unit 304 to generate a completion notification mail for notifying the user that the operation of closing the window is finished, and sends the mail to the communication terminal 103 of the user.

If the operation completion notification is not transmitted to the communication terminal 103 at the levels 3, 2, 1 as shown in FIG. 6, when determining the level in step S506, for example, a message such as "because you are near the car, the operation completion mail will not be sent", may be displayed on the Web page being accessed by the user to notify the user.

As described above, according to the present embodiment, while execution of careful fail safe operations is set as a default state, when the user who requests the remote operation is at a position close to the vehicle to be remotely operated and the situation of the vehicle can be grasped by the user, contents of the fail safe operations are simplified, namely, the fail safe criterion is moderated. In this way, while the minimum safety requirements are being satisfied, a quick remote operation can be realized which is simple and is of good response to the user's request.

In the above descriptions, as shown in FIG. 6, it is exemplified that the distance between the vehicle 101 and the communication terminal 103 is divided into four levels, and the number of the fail safe operations is reduced one by one when the user comes close to the user. However, the present embodiment is not limited to this example, but any value can be assigned to the total number of the levels, and to the number of the fail safe operations to be reduced when the user comes close to the user.

Nevertheless, when the user comes close to the vehicle, it is preferable that the fail safe operations be omitted in the order as described above and shown in FIG. 6, namely, from (e) "sending operation results of the remote operation", to (d) "confirming situations before the remote operation", and to (c) "using a safety operation pattern in execution of the remote operation", because this order is decided appropriately according to the distance between the vehicle 101 and the communication terminal 103.

Second Embodiment

FIG. 7 through FIG. 12 disclose a vehicle remote operation system according to a second embodiment of the present invention.

In the first embodiment, when changing the number of the fail-safe operations according to the distance between the user and the vehicle, the distance between the communication terminal carried by the user and the vehicle is calculated, the obtained distance is divided into four levels, and different fail-safe operations are performed for different levels.

In a vehicle remote operation system 700 according to the present embodiment, it is not necessary to calculate the distance between the communication terminal carried by the user and the vehicle, thus it is not necessary to provide current position detectors, such as GPS receivers, in the in-vehicle device of the vehicle and in the communication terminal carried by the user, instead, a Smart Entry System installed in a vehicle 701, which is to be remotely operated, detects a key carried by the user, and depending on whether the key is detected by the Smart Entry System, the contents of the fail-safe operations, which are executed in execution of the remote control requested by the user, are classified into two levels, resulting in a more simplified fail-safe criterion.

FIG. 7 is a diagram schematically illustrating an overall configuration of the vehicle remote operation system 700 according to the present embodiment.

The vehicle remote operation system 700 includes the vehicle 701, which is to be remotely operated; a center (vehicle remote operation device) 702 which is a communication station, and is managed by, for example, an automobile manufacturer, or an automobile retailer, or a professional company; and a communication terminal 103 carried by a user (owner) of the vehicle 701.

When the vehicle 701 executes the remote control requested by the user through the center 702, the contents of the fail-safe operations are changed depending on whether the Smart Entry System detects that the key carried by the user is within a certain detection area.

Below, descriptions are made of configurations of the vehicle remote operation system 700 and the vehicle remote operation performed by the devices with reference to FIG. 8 through FIG. 12.

Figure 8:
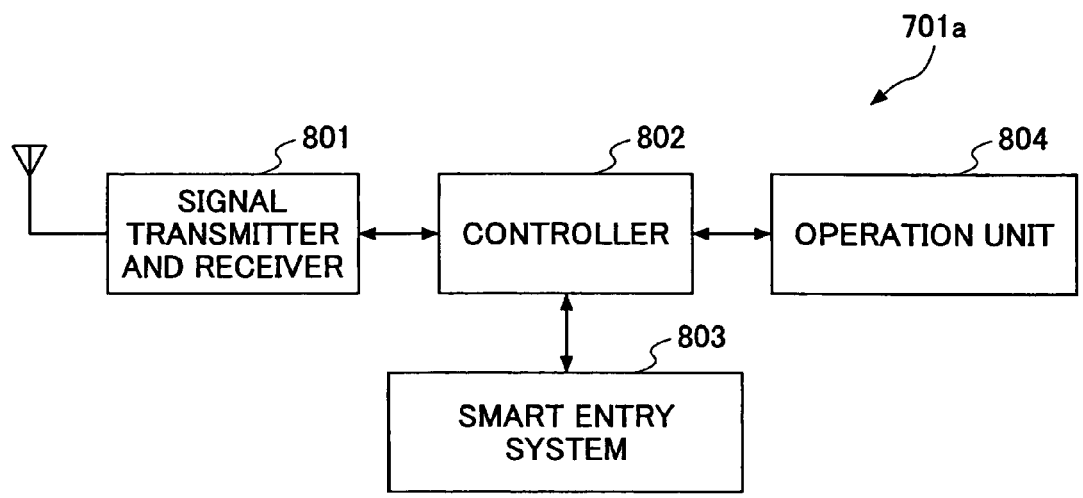
FIG. 8 is a block diagram schematically illustrating a configuration of an in-vehicle device 701a installed in the vehicle 701 for executing operations as directed by the center 702.

FIG. 8 is a block diagram schematically illustrating a configuration of an in-vehicle device 701a installed in the vehicle 701 for executing operations as directed by the center 702.

The in-vehicle device 701a includes a signal transmitter and receiver 801 for transmitting signals to and receiving signals from the center 702, a controller 802 for controlling components of the in-vehicle device 701a, a SMART ENTRY SYSTEM 803 for automatically locking or unlocking a door of the vehicle 701, and an operation unit 804 for executing operations such as locking a door or turning off a hazard lamp or closing a window.

The Smart Entry System 803 is also referred to as "Smart Key System" (registered trade mark), which is a key-less entry system, and the user does not need to press any buttons when using the Smart Entry System 803. Specifically, the in-vehicle device 701a installed in the vehicle 701 transmits a calling signal at certain intervals. When a radio device (the key) carried by the user receives the calling signal, the radio device sends a response signal. When the response signal is received by the in-vehicle device 701a, the vehicle 701 unlocks the door or locks the door. With the Smart Entry System 803, when the user carrying the key just moves close to or away from the vehicle 701, the door of the vehicle 701 is unlocked or locked, respectively.

The operation unit 804 executes the fail safe operations as described below.

When the controller 802 receives an instruction of closing an open window from the center 702 through the signal transmitter and receiver 801, the controller 802 controls the operation unit 803 to close the window, and at the same time, determines whether the Smart Entry System detects the key; the controller 802 directs the operation unit 804 to execute the fail safe operations corresponding to this result.

Figure 9:
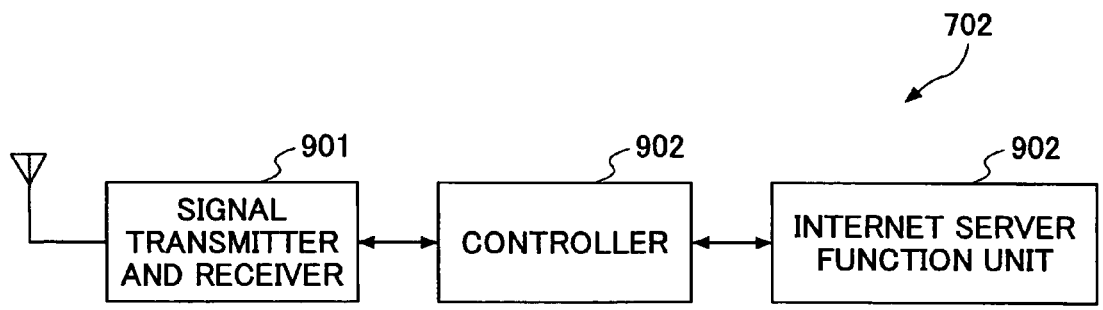
FIG. 9 is a block diagram schematically illustrating a configuration of the center 702 which acts as a vehicle remote operation device to direct the in-vehicle device 701a of the vehicle 701 to execute the remote operations requested by the user.

FIG. 9 is a block diagram schematically illustrating a configuration of the center 702 which acts as a vehicle remote operation device to direct the in-vehicle device 701a of the vehicle 701 to execute the remote operations requested by the user.

The center 702 includes a signal transmitter and receiver 901 for transmitting signals to and receiving signals from the in-vehicle device 701a, a controller 902 for controlling components of the center 702, and an Internet server function unit 903 able to provide Web pages accessible by the user through the communication terminal 703 and able to send emails to the communication terminal 703.

When the controller 902 receives a request of a remote operation from the communication terminal 703 through the Internet server function unit 903, the controller 902 sends an operation instruction to the vehicle 701 through the signal transmitter and receiver 801.

Figure 10:
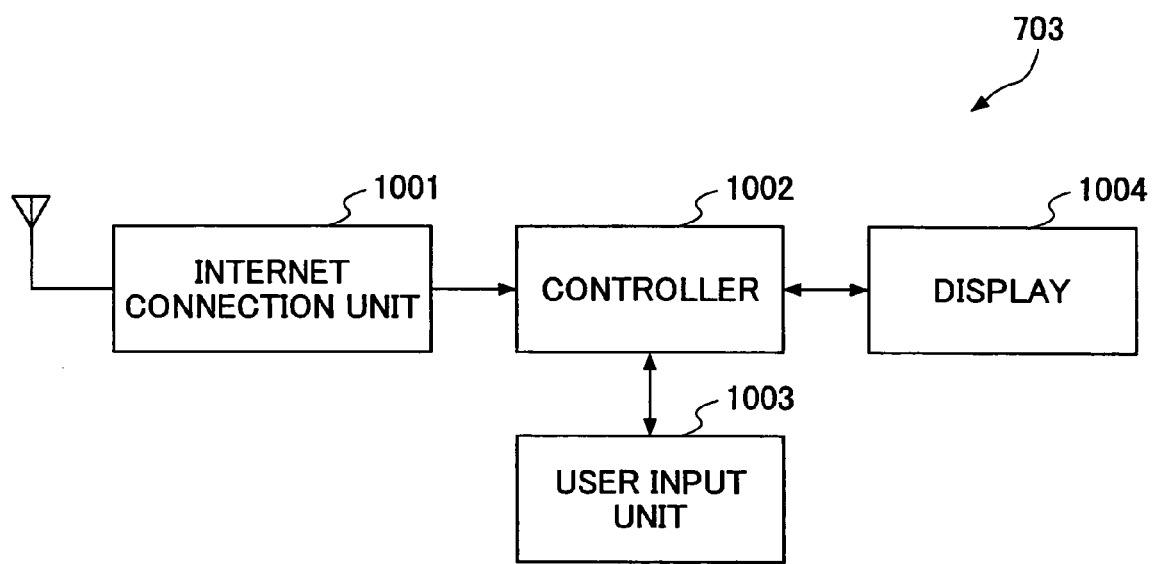
FIG. 10 is a block diagram schematically illustrating a configuration of the communication terminal 703 used when the user executes the remote operation.

FIG. 10 is a block diagram schematically illustrating a configuration of the communication terminal 703 used when the user executes the remote operation.

For example, the communication terminal 703 is a cellular phone and is able to connect to the Internet. Alternatively, the communication terminal 703 may be a PDA (Personal Digital Assistant) or a notebook personal computer.

The communication terminal 703 includes an Internet connection unit 1001 for accessing a Web page provided by the Internet server function unit 903, a controller 1002 for controlling components of the communication terminal 703, a user input unit 1003 for inputting character strings to the communication terminal 703 and for selecting items from a menu, and a display 1004 for displaying the Web page being accessed to the user.

For example, the display 1004 is a small LCD (liquid crystal display), alternatively, the display 1004 may be integrated with the user input unit 1003 and used as a touch panel.

Below, a description is made of the vehicle remote operation performed by the devices having the above configuration.

Figure 11:
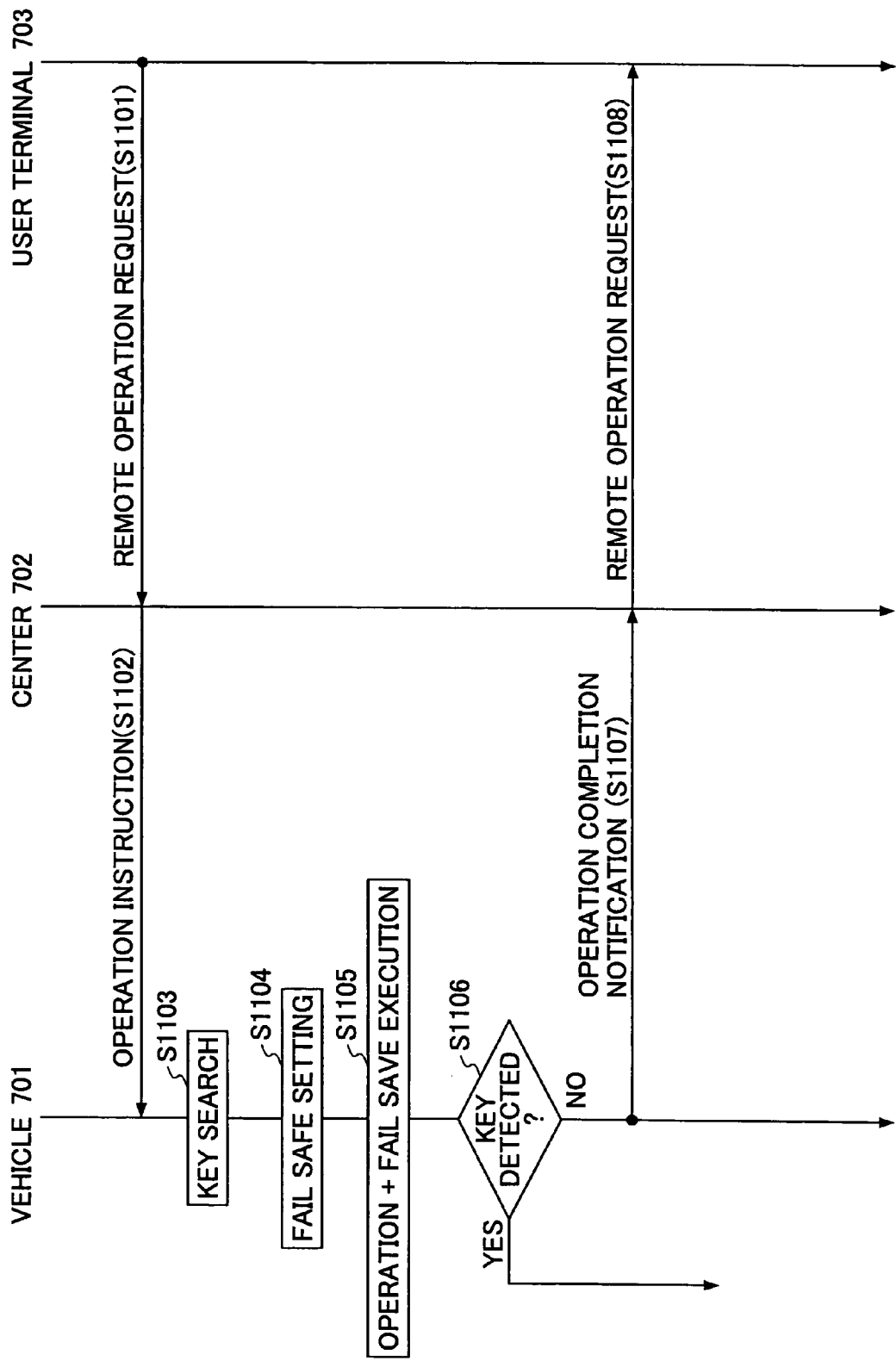
FIG. 11 is a sequence diagram illustrating the vehicle remote operation according to the second embodiment.

FIG. 11 is a sequence diagram illustrating the vehicle remote operation according to the present embodiment.

In step S1101, the user accesses the Web page provided by the Internet server function unit 903 of the center 702 by using the communication terminal 703; for example, the user requests a remote operation of closing the window of the vehicle 701.

For example, the user is reminded by the center 702 to make this request through the following series of actions. Specifically, the in-vehicle device 701a detects that the window is open even after the IG of the vehicle 701 has been tuned off for a time period, and the in-vehicle device 701a notifies the center 702 of this fact. Then, the center 702 sends a message to the communication terminal 703 by an email through the Internet server function unit 903 to remind the user that he or she forgot to close the window.

In step S1102, on the Wed page, after the user is authenticated, and an item of "close the window" is selected on the Wed page, the controller 902 of the center 702 uses the signal transmitter and receiver 901 to direct the vehicle 701 to perform an operation of closing the window.

In step S1103, on the side of the vehicle 701, when the signal transmitter and receiver 801 receives operation instructions from the center 702, the controller 802 directs the SMART ENTRY SYSTEM 803 installed in the vehicle 701 to detect whether the key carried by the user is within a certain detection area.

In step S1104, when the controller 802 receives a report indicating whether the key carried by the user is detected, the controller 802 specifies a fail safe level when executing the remote operation according to the detection results of the SMART ENTRY SYSTEM, as shown in FIG. 12.

In step S1105, the controller 802 directs the operation unit 804 to automatically raise the window (window auto up) to close the window which is open, and executes the fail safe operations.

FIG. 12 is a table exemplifying the correspondence relationship between the detection results of the SMART ENTRY SYSTEM and the fail safe level.

As shown in FIG. 12, depending on whether the key is detected by the Smart Entry System, the distance from the vehicle 701 to the communication terminal 703 is classified into two levels, and at different levels, the contents of fail safe operations are set to be different.

As shown in FIG. 12, a default state is defined to correspond to the case in which the key is detected by the Smart Entry System; if the key is detected by the Smart Entry System, the number of the fail safe operations to be executed is reduced, making the fail safe criterion moderate.

Specifically, if the key is not detected by the Smart Entry System, it is regarded that the remote operation is a usual remote operation, in which the user is far away from the vehicle 701. In this case, since the user is not aware of the current situation of the vehicle 701, all the fail safe operations shown in FIG. 12 are executed.

For example, as shown in FIG. 12, in the remote operation of closing the window of the vehicle 701, the fail-safe operations may include (a) sending a reminder message before the remote operation, (b) directing a window trapping protection mechanism to operate, (c) using a safety operation pattern in execution of the remote operation, (d) confirming situations before the remote operation, and (e) sending operation results of the remote operation.

Detailed explanations of the above fail-safe operations are omitted.

When the key is detected by the Smart Entry System, it is regarded that the user is near the vehicle 701 and is able to access to the vehicle 701 immediately. In this case, since the user can easily confirm the conditions of the vehicle 701 before the remote operations and remove interference, for example, the user can easily confirm that the vehicle 701 is not running; if the key is being inserted in the vehicle 701, the user can easily withdraw the key by himself; if the door is open, the user can easily close the door by himself; further, if some persons are in the vehicle 701, the user can easily urge them to come out. Therefore, when the key is detected by the Smart Entry System, among the above fail safe operations (a), (b), (c), (d), and (e), the fail safe operations of. (d), namely, confirming situations before the remote operation, and (e), namely, sending operation results of the remote operation, can be omitted.

In other words, even when the key is detected, in order to ensure safety at the least level, the fail safe operations of (a), namely, sending a reminder message before the remote operation, (b), namely, directing a window trapping protection mechanism to operate, and (c), namely, using a safety operation pattern in execution of the remote operation, are performed.

As a result, when the key is detected, the user is able to perform the remote operation quickly, and undue fail-safe operations are omitted, this makes the remote operation convenient and of good response to the user's request.

Returning to FIG. 11, In step S1106, after the requested remote operation is performed, and the fail-safe operations are executed appropriately depending on whether the key is detected by the Smart Entry System, and the controller 802 of the in-vehicle 701a determines whether it is necessary to send the operation results of the remote operation (that is, if the key is not detected in the example shown in FIG. 12).

If it is determined that it is not necessary to send the operation results (that is, "NO" in step S1106), in step S1107, the controller 802 of the in-vehicle device 701a sends an operation completion notification to the center 702 through the signal transmitter and receiver 801.

In step S51108, on the side of the center 702, when the signal transmitter and receiver 901 receives the operation completion notification from the vehicle 701, the controller 902 directs the Internet server function unit 903 to generate a completion notification mail for notifying the user that the operation of closing the window is finished, and sends the mail to the communication terminal 703 of the user.

According to the present embodiment, even though current position detectors, such as GPS receivers, are not provided in the in-vehicle device 701a of the vehicle 701 and in the communication terminal 703 carried by the user, the Smart Entry System 803 installed in the vehicle 701 is used to detect the key carried by the user, and depending on whether the key is detected by the Smart Entry System, different fail-safe operations are executed; specifically, a smaller number of the fail-safe operations are executed when the key is detected than when the key is not detected. In this way, it is possible to simply set the fail-safe criterion according to the distance between the communication terminal 703 carried by the user and the vehicle 701.

As described in the above embodiments, when the user is aware of the present situation of the vehicle, the contents of the fail safe operations are simplified, that is, the fail safe criterion is moderated. In the above, the awareness of the user about the present situation of the vehicle is approximately expressed by the distance between the user and the vehicle. That is, it is assumed that the user is better aware of the present situation of the vehicle, when the user is closer to the vehicle.

However, even when the user is relatively close to the vehicle, sometimes the user cannot be aware of the situation of the vehicle. For example, when there are obstacles, such as buildings or trees, between the user and the vehicle, the user cannot see the vehicle. When the user is in a building, for example, on the second floor, and the car is parked outside the building, the user can see the car, but cannot come close to the car immediately.

Considering these situations, in addition to the fail safe criterion based on the distance between the user and the vehicle, as described above, other criteria may also be used. For example, the awareness of the user about the present situation of the vehicle can be predicted based on map data by considering the visibility of the vehicle from the user or accessibility of the vehicle from the user.

Regardless of the above fail safe criteria, for purpose of safeness, when it is not clear whether the user is aware of the situation of the vehicle, it is preferable that the default fail-safe operations with most carefulness be executed.

From FIG. 6 and FIG. 12, it is clear that the fail-safe operations executed when the key is detected in the second embodiment correspond to the fail-safe operations executed when the distance between the user and the vehicle is classified to be the level 2 in the first embodiment, and the fail-safe operations executed when the key is not detected in the second embodiment correspond to the fail-safe operations executed when the distance between the user and the vehicle is classified to be the level 4 in the first embodiment. In other words, the case when the key is detected in the second embodiment correspond to integration of the level 1 and level 2 in the first embodiment, and the case when the key is not detected in the second embodiment correspond to integration of the level 3 and level 4 in the first embodiment.

Namely, in the second embodiment, depending on whether the key is detected by the Smart Entry System, the levels 1, 2, 3, 4 in the first embodiment are arranged into a stage corresponding to the levels 1 and 2, and a stage corresponding to the levels 3 and 4. This two stage scheme of the fail-safe operations simplifies setting of the fail-safe operations.

From this point of view, the present invention may have other embodiments, for example, depending on whether the user is inside the vehicle, the fail-safe operations at the levels 1, 2, 3, 4 in the first embodiment may be re-arranged into a stage corresponding to the level 1, and a stage corresponding to the levels 2, 3 and 4. Alternatively, depending on whether the vehicle is within the visual range of the user, the fail-safe operations at the levels 1, 2, 3, 4 in the first embodiment may be re-arranged into a stage corresponding to the levels 1, 2, 3 and a stage corresponding to the level 4.

In the former case, for example a camera may be installed in the vehicle to detect whether the user is inside the vehicle. In the latter case, for example, when requesting a remote operation on a Web page provided by the center, a question may be provided such as "can you see your car", and the user is required to answer the question.

In either of the above two cases, preferably, the fail safe operations to be executed correspond to the highest level to make the fail safe criterion more strict. Specifically, in the former case, at the stage corresponding to the levels 2, 3 and 4, the fail safe operations corresponding to the level 4 are executed. In the latter case, at the stage corresponding to the levels 1, 2, 3, the fail safe operations corresponding to the level 3 are executed.

The present invention is applicable to a vehicle remote operation device that directs a vehicle to execute operations in response to a remote operation request made by a user of the vehicle regardless of the shape, weight, size and performance of the vehicle.

According to the present invention, it is possible to provide a vehicle remote operation device of optimized fail-safe function.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2005-045863 filed on Feb. 22, 2005, the entire contents of which are hereby incorporated by reference.

What is claimed is:

1. A vehicle remote operation device configured to receive a remote operation request from a communication terminal carried by a user of a vehicle through a control center to execute a remote operation, the vehicle remote operation device comprising:

a smart entry system configured to detect a key;

a storage unit configured to store a plurality of fail-safe criteria for each of a plurality of vehicle operations, the plurality of fail-safe criteria including a criterion for executing a fail-safe operation for assisting a safe execution of the corresponding vehicle operation; and a control unit configured to select a different fail-safe criterion for each vehicle operation, according to a distance between the user and the vehicle, wherein the control unit is configured to notify the communication terminal of an operation result, by sending an email message after the remote operation is completed, if the distance between the user and the vehicle equals a value such that the key is not detectable by the smart entry system, and wherein the control unit is configured to not notify the communication terminal of the operation result after the remote operation is completed if the distance between the user and the vehicle equals a value such that the key is detectable by the smart entry system.

2. The vehicle remote operation device as claimed in claim 1, wherein the control unit is configured to not perform a condition confirmation before the remote operation when performing fail-safe operations after the smart entry system has detected the key.

3. The vehicle remote operation device as claimed in claim 1, wherein the control unit is configured to send a reminder message before executing a remote operation, even when performing fail safe operations after the smart entry system has detected the key.

4. The vehicle remote operation device as claimed in claim 1, wherein the control unit is configured to perform fail-safe operations that include directing a window trapping protection mechanism to operate when performing a remote operation to close a window of the vehicle, even after the smart entry system has detected the key.

5. The vehicle remote operation device as claimed in claim 1, wherein the control unit is configured such that, when performing the fail-safe operations, when the smart entry system has not detected the key, the control unit sends a reminder message before the execution of the remote operation, uses a safety operation pattern in the execution of the remote operation, performs condition confirmation before the execution of the remote operation, and notifies the user of an operation result of the remote operation;

when the smart entry system detects the key, the control unit performs fail-safe operations that include sending a reminder message before the execution of the remote operation, and using a safety operation pattern in the execution of the remote operation; and the control unit directs a window trapping protection mechanism to operate when performing the remote operation to close a window of the vehicle no matter whether the key is detected.

6. The vehicle remote operation device as claimed in claim 1,
wherein the control unit is configured to divide the distance between the user and the vehicle into at least two levels, according to whether the vehicle is within a visual range of the user, the visual range being a range such that the user is able to confirm a condition of the vehicle, and
wherein the control unit is configured to perform fail-safe operations that do not include notifying the user of an operation result of the remote operation when the vehicle is within the visual range of the user.

7. The vehicle remote operation device as claimed in claim 1,
wherein the control unit is configured to divide the distance between the user and the vehicle into at least two levels according to whether the vehicle is within a reach of the user's arm, and
wherein the control unit is configured to perform fail-safe operations that do not include a condition confirmation before the remote operation, when the vehicle is within the reach of the user's arm.

8. The vehicle remote operation device as claimed in claim 1,
wherein the control unit is configured to divide the distance between the user and the vehicle into at least two levels according to whether the user is inside the vehicle, and
wherein the control unit is configured to perform fail-safe operations that do not include using a safety operation pattern in the execution of the remote operation, when the user is inside the vehicle.

9. The vehicle remote operation device as claimed in claim 1, wherein the control unit is configured to perform fail-safe operations that include sending a reminder message before the execution of the remote operation.

10. The vehicle remote operation device as claimed in claim 1, wherein the control unit is configured to perform fail-safe operations that include directing a window trapping protection mechanism when performing the remote operation to close a window of the vehicle.

11. The vehicle remote operation device as claimed in claim 1, wherein
the control unit is configured to divide the distance between the user and the vehicle into a first level, a second level, a third level, and a fourth level in ascending order,
the first level is defined as when the user is inside the vehicle,
the second level is defined as when the vehicle is within the reach of the user's arm,
the third level is defined as when the vehicle is within the visual range of the user,
the fourth level is defined as when the distance between the user and the vehicle is not classified into one of the first level, the second level, and the third level; when the distance between the user and the vehicle is classified into the fourth level, the fail-safe operations include sending a reminder message before the execution of the remote operation, using a safety operation pattern in the execution of the remote operation, condition confirmation before the execution of the remote operation, and notifying the user of an operation result of the remote operation;
when the control unit classifies the distance between the user and the vehicle into the third level, the control unit performs the fail-safe operations that include sending a reminder message before the execution of the remote operation, using a safety operation pattern in the execution of the remote operation, and performing condition confirmation before the execution of the remote operation;
when the control unit classifies the distance between the user and the vehicle into the second level, the control unit performs the fail-safe operations that include sending a reminder message before the execution of the remote operation, and using a safety operation pattern in the execution of the remote operation;
when the control unit classifies the distance between the user and the vehicle into the first level, the control unit performs the fail-safe operations that include sending a reminder message before the execution of the remote operation; and
when performing the remote operation to close a window of the vehicle, the control unit performs the fail-safe operations that include directing the window trapping protection mechanism to operate regardless of the level of the distance.

* * * * *